Nov. 19, 1935.　　　A. PANARO　　　2,021,462

HEATING APPLIANCE

Filed Jan. 22, 1934

Antonio Panaro, INVENTOR.

BY J. Stanley Burch

ATTORNEY.

Patented Nov. 19, 1935

2,021,462

UNITED STATES PATENT OFFICE 2,021,462

HEATING APPLIANCE

Antonio Panaro, Sidney, N. Y., assignor of one-half to William H. Phelps, Sidney, N. Y.

Application January 22, 1934, Serial No. 707,817

1 Claim. (Cl. 126—67)

This invention relates broadly to heating appliances, and has more particular reference to the provision of an attachment for portable heating stoves of the hot air type having an ornamental outer casing or unit and an inner or stove unit proper spaced from said outer unit so as to provide air circulating passages therebetween, as generally disclosed in the U. S. patent to Walter Nagle, No. 1,882,159, dated October 11, 1932.

The primary object of the present invention is to provide an attachment of the above kind embodying a hot air conduit to be fitted and secured upon the upper end of a portable heating stove of the type above described so as to receive the hot air discharging through the perforated top of the outer casing of said stove and to direct said heated air laterally for the purpose of more efficiently heating the closure or room in which the stove is located or for conveying said hot air to a register opening into an adjoining room for heating the latter.

A further object is to provide a heating stove attachment of the above kind which is simple in construction, efficient in use, and capable of being readily installed.

Still another object of the present invention is to provide an attachment of the above kind having means for forcing the heated air through the attachment or conduit so as to accelerate the flow of such heated air and to secure maximum heating efficiency.

With the above objects in view, the invention consists in the novel form, combination and arrangement of parts hereinafter more fully described, shown in the accompanying drawing and claimed.

Figure 1:
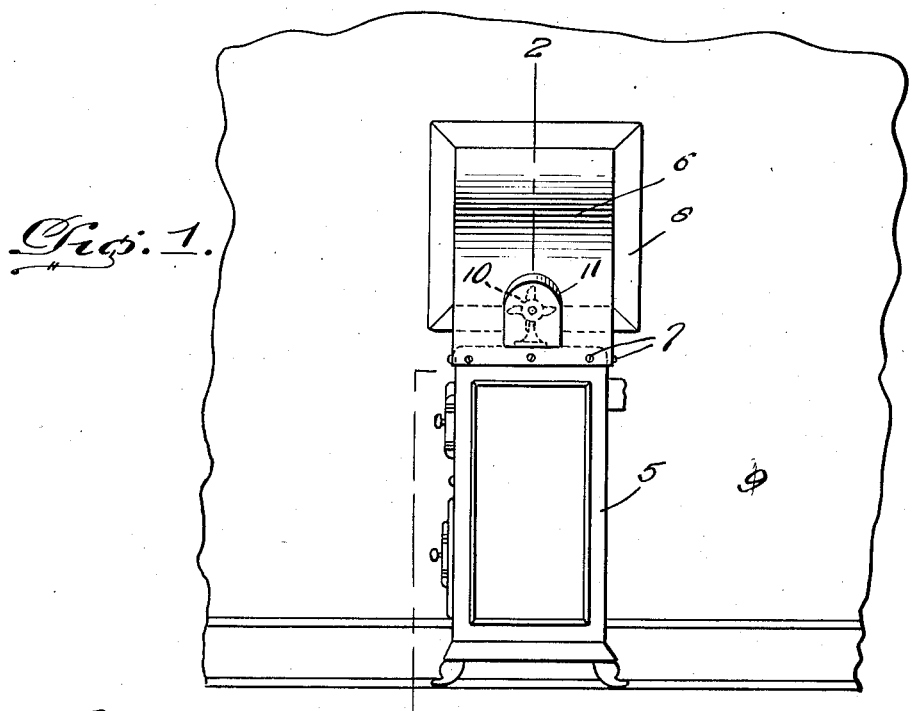
Figure 1 is a side elevational view of a portable heating stove equipped with an attachment in accordance with the present invention.

Referring more in detail to the drawing, 5 indicates a conventional portable heating stove of any suitable specific construction and of the type having an ornamental outer casing or unit and an inner stove unit proper spaced from said outer casing or unit to provide air circulating passages therebetween, as disclosed in the above-mentioned patent. As is also disclosed in said patent, this type of heating stove has provision for admitting air to the air circulating passages between the unit of the stove at the bottom of the latter, while the top of the outer casing or unit is perforated to permit the escape of heated air from said air circulating passages. Ordinarily, this escaping heated air is simply allowed to escape directly into the room containing the stove, rising in the room and spreading as it rises. The object of the present invention is to provide a heating stove of this type with an attachment whereby the escaping heated air is directed laterally to either more efficiently heat the enclosure or room in which the stove is located or to conduct said heated air to a register in an adjacent partition for heating an adjoining room.

The attachment embodying the present invention consists of a sheet metal conduit 6 of elbow-like form and of a shape to snugly fit over or slip onto the upper end of the outer casing of stove 5 as shown, the attachment or conduit 6 being rigidly secured in place upon the stove by bolting or the like as at 7. By this means, the heated air escaping from the air circulating passages between the outer casing and the inner unit of the stove 5 is received by the conduit 6 and directed or conveyed laterally by the latter where it is discharged in a lateral direction at one side of the stove. This heated air is not tempered or cooled before it is discharged as no cool air can enter the attachment or conduit 6 between the latter and the stove casing where the conduit or attachment 6 fits over the top of the latter.

As shown in Figure 1, the attachment or conduit 6 may be utilized for conveying the heated air to a register 8 installed in a partition 9 between the room or enclosure in which the stove 5 is located and an adjoining enclosure or room, whereby the heated air is discharged into said adjoining enclosure or room for heating the latter. With this installation, the stove 5 is located adjacent the partition 9, and the upper or outlet end of the conduit or attachment 6 is connected directly to the casing of the register 8 in a manner obvious to those skilled in the art.

Figure 2:
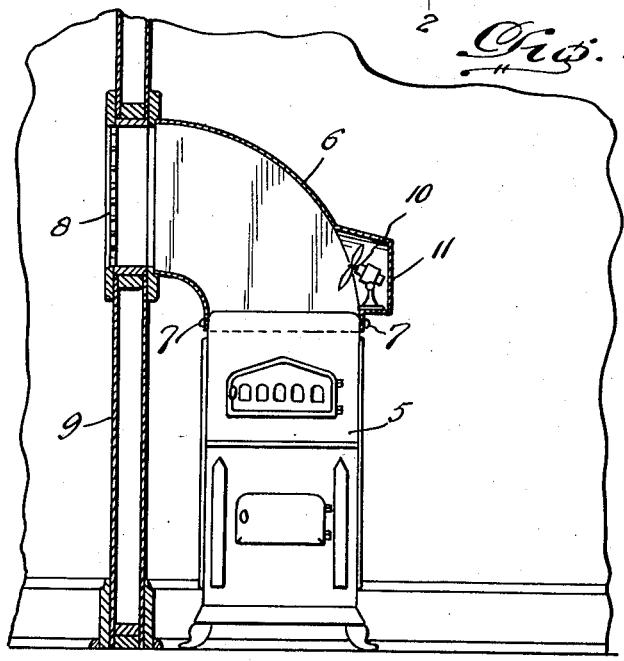
Figure 2 is a view partly in section and partly in elevation and taken substantially on line 2—2 of Figure 1.
Figure 3:
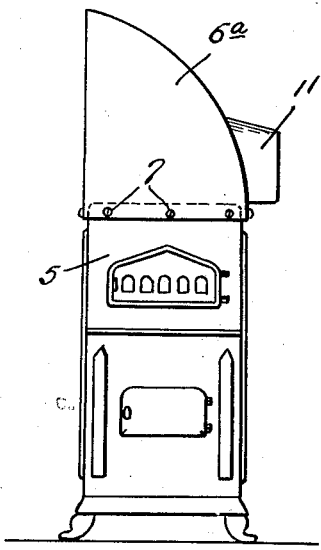
Figure 3 is a front elevational view of a portable heating stove provided with a modified form of attachment constructed in accordance with the present invention.

As shown in Figure 3, the attachment may simply terminate and open at one side of the stove to merely act as a hood for directing the heated air laterally of the stove and across the enclosure or room in which the stove is located for more efficiently heating the latter than would be the case if the attachment or hood were omitted so that the heated air were allowed to immediately rise and spread at the top of the enclosure or room. This modified form of conduit or attachment is indicated in Figure 3 by the reference character 6a, and it is substantially of the same construction as the conduit or attachment of Figures 1 and 2 except that it is made shorter or not extended any material distance beyond the side of the stove, such as is necessary for connection with a register in an adjacent partition.

In order to accelerate the flow of heated air through the attachment or conduit so as to increase the heating efficiency of the appliance composed of the stove and the conduit, a small electric fan 10 may be carried by the conduit or attachment 6 so as to act upon the heated air flowing therethrough and accelerate the flow thereof in an upward and lateral direction away from the stove itself. When the fan 10 is utilized, it is preferably mounted in a suitable housing 11 provided on one side of the conduit 6 or 6a near the lower end of the latter and in surrounding relation to an opening provided in said conduit 6 or 6a so that the fan 10 may act upon the heated air flowing therethrough.

From the foregoing description, it will be seen that I have provided a device of the character described which is capable of attaining the stated objects in a thorough and efficient manner, the device being extremely simple and durable in construction as well as capable of ready and efficient installation upon existing stoves of the type mentioned.

While I have specifically described two embodiments of the invention having great utility and probably answering most needs, it will be apparent that the invention is susceptible of further modifications and changes in structural details without departing from the spirit and scope of the invention as claimed. For instance, the conduit or attachment may be provided with two outlets extending in opposite directions instead of one if found necessary or desirable, which variation of the invention would involve little more than mere duplication.

What I claim as new is:

An attachment for portable heating stoves of the hot air type, wherein air circulating passages are provided between an outer casing and an inner stove unit, and wherein the top of said outer casing is perforated to permit escape of hot air from said passages, comprising a tubular conduit of elbow-like form shaped to snugly fit at one end onto the upper end of the outer casing of said stove so as to receive and direct laterally the air escaping from said passages, means to secure said end of the conduit onto the upper end of the stove casing, a fan carried by said conduit for accelerating the flow of escaping hot air therethrough, said conduit having an opening in one side near the bottom of the same, and an external housing carried by said conduit in surrounding relation to said opening, said fan being mounted in said housing.

ANTONIO PANARO.